Feb. 8, 1927.  1,616,685
J. W. FRAZIER ET AL
SPRAYING DEVICE
Filed June 15, 1925
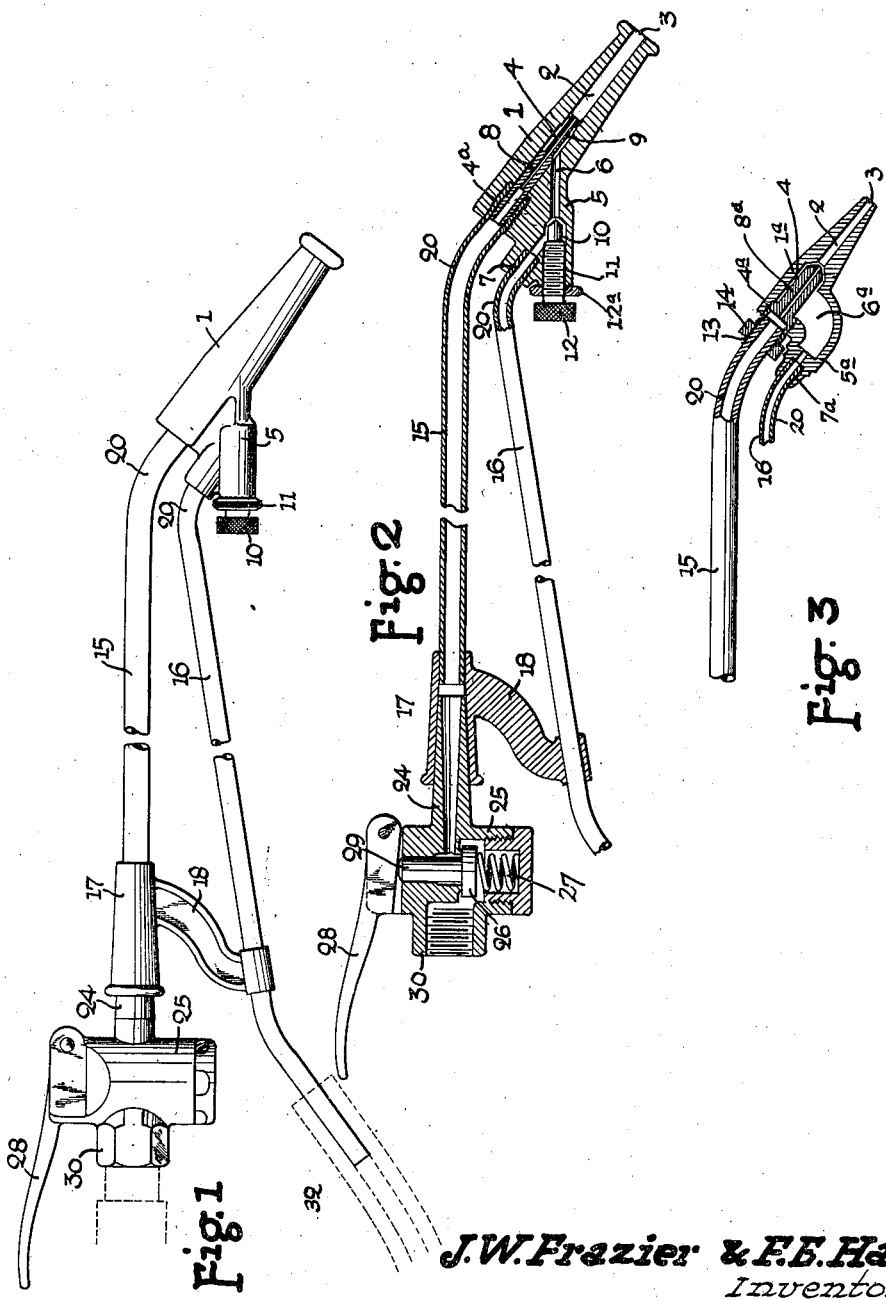
J.W.Frazier & F.E.Hansen
Inventors
By Smith & Freeman
Attorneys Patented Feb. 8, 1927.

1,616,685

UNITED STATES PATENT OFFICE.

JAMES W. FRAZIER, OF CLEVELAND, AND FRED E. HANSEN, OF LAKEWOOD, OHIO, ASSIGNORS TO THE HANSEN MANUFACTURING COMPANY, OF CLEVELAND, OHIO, A CORPORATION OF OHIO.

SPRAYING DEVICE.

Application filed June 15, 1925. Serial No. 37,078.

This invention relates to spraying devices and has for its object the provision of a simple, attractively designed, inexpensive, and strongly constructed tool for applying or removing oil and grease by the use of compressed air. Certain physical forms of which our invention is embodied are shown in the accompanying drawings in which Fig. 1 is a side elevation and Fig. 2 a longitudinal section of a preferred form of device, and Fig. 3 is a detail view showing a slightly modified form of nozzle.

A preferred form of our improved device comprises a nozzle member 1 having therein a longitudinal bore 2 which terminates in a discharge orifice 3 at one end and a counterbore 4 at the other end. Formed at one side of the nozzle near this counterbore is an enlargement 5 formed with a branch passageway 6 which communicates with the counterbore 4 near its inner end, this enlargement also being formed with a pipe receiving socket 7 located near the counterbore and preferably parallel thereto for purposes of manufacturing convenience, although in an operative way other angular relations would be equally advantageous. The outer end of the counterbore is internally threaded as shown at 4ª for the reception of the external threads on the pipe 15. Fitting in the counterbore 4 is the body 8 of a nipple member, one end of which is threaded into the pipe 15, and the other end is formed with a jet nozzle 9 of smaller external diameter than the bore 2, said jet nozzle bridging the end of the passageway 6 and extending a short distance into said bore. The outer end of the passageway 6 is enlarged to form the chamber 10 which is internally threaded for the reception of the needle valve 11 here shown as provided with a knurled head 12 and lock nut 13ª.

In the form shown in Fig. 3 the enlargement is formed with a passage 6ª entering the side of the counterbore 4 as before, but the nipple member 8ª is movable longitudinally therein so as itself to constitute a valve for the branch passageway, being here shown as threaded externally to fit the threads 4ª and internally to fit the threads 13 on the pipe 15, the end of the nipple member projecting from the nozzle member in the form of a knurled knob 14. The threads 4ª and 13 being of the same direction and pitch this member can be readily turned to control the branch passageway.

Leading to the counterbore 4 and socket 7 are pipes 15 and 16 respectively, the former tightly secured in the base of the socket member 17 and the latter secured to or supported by an arm 18 carried by said socket member. The distance between these pipes at this point preferably is made greater than at the nozzle so that the triangular arrangement affords increased strength; and in addition both pipes are preferably bent at points 20, 20 near the nozzle member so that the latter is deflected obliquely as regards the axis of the nozzle member. When the discharge ends of these pipes are parallel as here shown these bends are unequal in order to produce the angular divergence mentioned.

In the construction shown in Figs. 1 and 2 both pipes are secured rigidly to the nozzle member. Owing to the fact that the pipes are bent it is obvious that both of them cannot conveniently be threaded, although one of the same can be screwed in place and the other brazed, or both can be brazed. Both pipes can be threaded in place in case they are not bent until after assembling. In the construction shown in Fig. 3 only the pipe 16 is rigidly fastened, the other being received by the nipple member in such wise as to permit rotation of the latter. This can be done either by means of threads equal in pitch and direction with those in the counterbore 4ª or one of the threads can be omitted although with considerable loss of strength.

The socket member 17 is here shown as formed with a tapering mouth adapted to receive the tapered nipple 24 of a valve 25, the latter being preferably of the lever type having a reciprocable member 26 normally closed by a spring 27 but adapted to be displaced by pressure of the lever 28 which bears against the projecting end 29 of said member. The body of this valve is also provided with a connection 30 for attachment to a suitable source of compressed air as indicated at 31 in Fig. 1. The pipe 16 projects beyond the arm 18 a sufficient distance to receive a flexible tube 32, which leads to a suitable receptacle (not shown) containing the liquid to be sprayed, which may be gasoline, kerosene, lubricating oil, water, polish, etc.

When the valve is properly adjusted and the valve 25 opened a spray of this liquid is ejected and may be used for cleansing oil, grease, and accumulated dirt from engines, wheels, running gear, etc. or for lubricating springs, or for washing windows, bodies, and walls, or for applying, polishing and coating materials, depending upon the liquid employed. By closing the valve 11 or 8ᵃ the liquid supply can be shut off and the air blast alone employed, either to blow away loose dirt or to dry the surface after cleansing. The pipes may be made of any length depending upon the nature of the work to be performed, and many other changes in detail can be made.

This application is a continuation in part of our prior application Serial No. 442,458.

Having thus described our invention what we claim is:

1. In a device of the character described, the combination with a nozzle member having a longitudinal bore and a passageway intersecting said bore, of rigid pipes leading to said bore and passageway respectively, a socket member to which one of said pipes is rigidly fastened, an arm carried by said socket member to which the other pipe is secured, and a control valve having an independently usable discharge nipple, said nipple being detachably connected to said socket member.

2. In a device of the character described, in combination, a nozzle member having a longitudinal bore and two pipes connected thereto, said pipes being bent obliquely near said nozzle member and by unequal amounts so that said pipes diverge from said member and said bore is oblique to both of them, a socket member fastened to the end of one of said pipes, a rigid arm carried by said socket member and fastened to the other pipe, a valve having a nipple detachably engaging said socket, and a valve carried by said nozzle member controlling the passage through the other pipe, said first valve having an operating lever parallel to said nipple and operable by movement entirely in the plane which includes said lever and nipple.

In testimony whereof, we hereunto affix our signatures.

JAMES W. FRAZIER.
FRED E. HANSEN.